(12) United States Patent
Aneiros et al.

(10) Patent No.: US 8,232,874 B1
(45) Date of Patent: Jul. 31, 2012

(54) VEHICLE CHILD SEAT SAFETY SYSTEM

(76) Inventors: Dennis Aneiros, Hialeah, FL (US); Madelin Garcia, Hialeah, FL (US)

( * ) Notice: Subject to any disclaimer, the term of this patent is extended or adjusted under 35 U.S.C. 154(b) by 334 days.

(21) Appl. No.: 12/567,757

(22) Filed: Sep. 26, 2009

(51) Int. Cl.
*B60Q 1/00* (2006.01)
(52) U.S. Cl. ....................................................... 340/438
(58) Field of Classification Search .............. 340/573.1, 340/457, 425.5, 667; 180/273
See application file for complete search history.

(56) References Cited

U.S. PATENT DOCUMENTS

| | | | | |
|---|---|---|---|---|
| 6,104,293 A * | 8/2000 | Rossi | .......................... | 340/573.1 |
| 2003/0122662 A1 * | 7/2003 | Quinonez | ..................... | 340/457 |
| 2003/0132838 A1 * | 7/2003 | Toles | ............................ | 340/457 |
| 2006/0273917 A1 * | 12/2006 | Rams, Jr. | ....................... | 340/667 |
| 2006/0290518 A1 * | 12/2006 | Bingle et al. | ................ | 340/573.1 |

* cited by examiner

*Primary Examiner* — Phung Nguyen

(57) ABSTRACT

A vehicle child seat safety system comprises a child seat sensor connected to a transmitter, a receiver in the vehicle connected to a processor controlling exterior lights, ignition switch, air conditioner, alarm and door locks, to advise a driver and passersby of a child left in the vehicle unattended, and provide for the access to the vehicle. The application is further directed to a method of informing of a child left unattended in a locked vehicle comprises providing a sensor in a child seat, starting the sensor when the ignition is turned off, generating a warning signal and transmitting same from a transmitter in the child seat after a predetermined time elapsed since starting the sensor, receiving the signal in the vehicle to direct a CPU of the vehicle to start an alarm sound signal and turn alarm lights on, and, if the sensor is not disabled, to further unlock door locks and start air conditioner.

1 Claim, 2 Drawing Sheets

VEHICLE CHILD SEAT SAFETY SYSTEM

FIELD OF THE INVENTION

The present disclosure relates to a vehicle child seat safety system intended to advise when a child is left in a hot vehicle.

BACKGROUND OF THE INVENTION

From time to time, and sadly not infrequently, media publishes information about infants and toddlers left in vehicle unattended. Sometimes, kids are lucky enough to be timely saved, sometimes not. It seems that every summer there are news reports of children dying when they are left behind in a closed vehicle. If a baby or young child is, inadvertently or purposefully, left in a vehicle, the child can quickly be in danger of serious heat-related problems. Even if windows are cracked open, the vehicle is parked in the shade, and the outside temperatures seems temperate to an adult, the inside vehicle temperature can quickly become unbearable to a child who is trapped in a car seat and who can do absolutely nothing to cool himself down. Tragic stories seem to occur every year of well-meaning but strssed and busy parents who forget to take their sleeping baby from the car, and the child pays for this mistake with his or her life. So, as it appears, this is the problem that needs at least a technical solution, and the aim of the present disclosure is to offer such a solution.

Known from U.S. Pat. No. 7,348,889 issued on Mar. 25, 2008, to Joseph J. Monzo et al. is a system and method to warn that a child has been left unattended in the vehicle for a pre-set period of time after the ignition has been turned off. The system includes a sensing device to detect if a child is in the infant seat, an ignition detection device to detect that the ignition has been turned off, a timing microprocessor device to time the pre-set period of time and to generate an alarm and a page, a prerecorded voice message and speaker, a reset button to reset the timing of the pre-set period of time if desired by the caregiver, and an FM antenna with a manual page button.

Disclosed in U.S. Pat. No. 6,104,293 issued on Aug. 15, 2000, to Marc A. Rossi is an apparatus provided for warning when a child has been left in an infant seat and a vehicle as been turned off. The apparatus includes an occupant detection mechanism for detecting the presence of an occupant within an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm units for generating an alarm in response to the alarm signal. The components of the apparatus can be located within the infant seat, within the vehicle or combined within the infant seat and the vehicle.

A need still exists for a vehicle child seat safety system that would be able to not only draw the attention of the driver and passersby to the child left unattended in a hot vehicle but also would provide the access to the child so that he/she could be rescued.

SUMMARY OF THE INVENTION

This goal is attained by providing a vehicle child seat safety system comprising a child seat sensor connected to a transmitter, and a receiver in the vehicle connected to a processor controlling exterior lights, ignition switch, air conditioner, alarm and door locks. Thus, the driver and passersby are advised of a child left in the vehicle unattended and are provided with the possibility to access the vehicle so that the child be prevented from being exposed to high temperature inside a locked vehicle.

A method of informing of a child left unattended in a locked vehicle according to the present disclosure comprises the steps of providing a sensor in a child seat, starting the sensor when ignition of the vehicle was turned off, generating a warning signal and transmitting same from a transmitter in the child seat after a predetermined time elapsed since the starting of the sensor, receiving the warning signal in the vehicle and sending same to a CPU of the vehicle to start an alarm sound signal and turn exterior alarm lights on, and, if the sensor remains not disabled, to further unlock door locks and start ignition and air conditioner to bring the temperature in the vehicle back to normal. In doing so, a driver and passersby are alerted, their attention is drawn to the vehicle with the child left unattended, and it is made possible for them to access the vehicle to rescue the child preventing the child from being exposed to high temperature inside the locked vehicle.

The above-identified features of the vehicle child seat safety system are believed to ensure the rescue of a child left unattended in a hot vehicle.

BRIEF DESCRIPTION OF THE DRAWINGS

Other objects, features and advantages of the disclosure will become apparent to one skilled in the art by reading the following specification and subjoined claims and by referencing the following drawings, in which:

DETAILED DESCRIPTION OF THE PREFERRED EMBODIMENT

Figure 1:
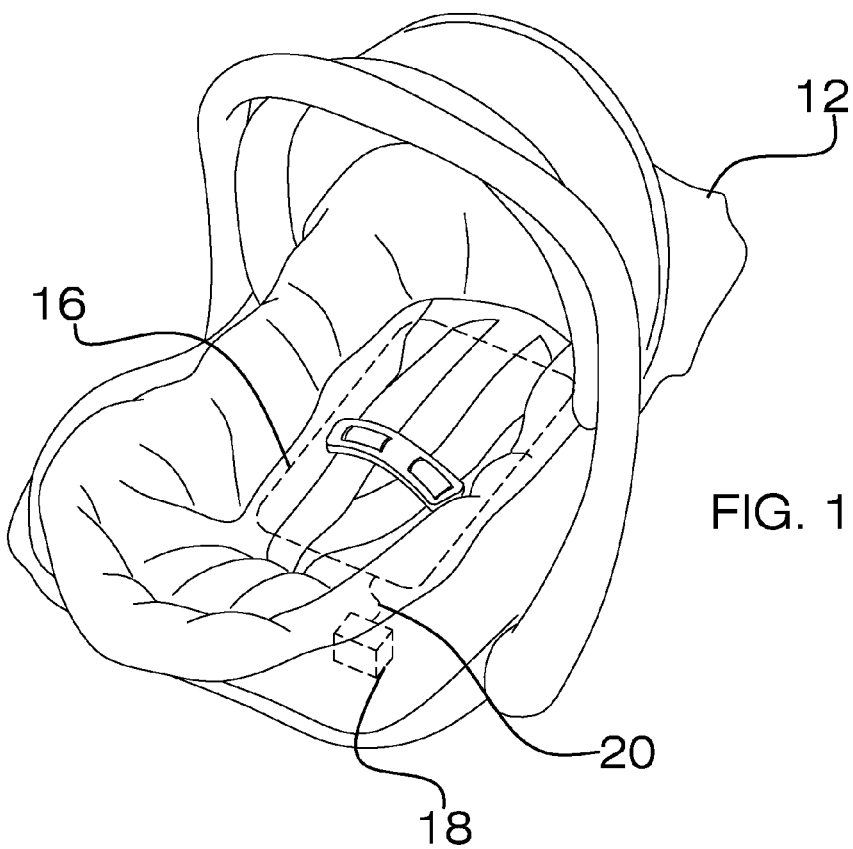
FIG. 1 is a perspective view of a child seat equipped with elements of a safety system according to the present disclosure.

Before starting a detailed description of the disclosure, mention of the following is in order. When appropriate, like reference numerals and characters may be used to designate identical, corresponding, or similar components in different figure drawings.

Figure 2:
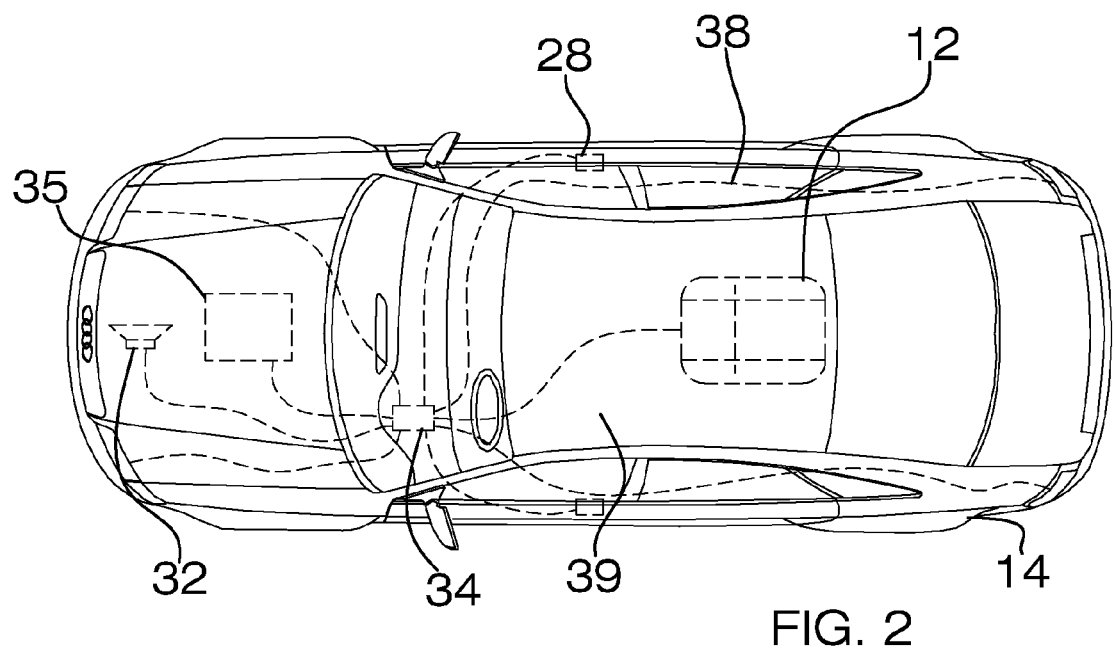
FIG. 2 is a top view of a vehicle with a child seat inside along with elements forming the system according to the present disclosure.
Figure 3:
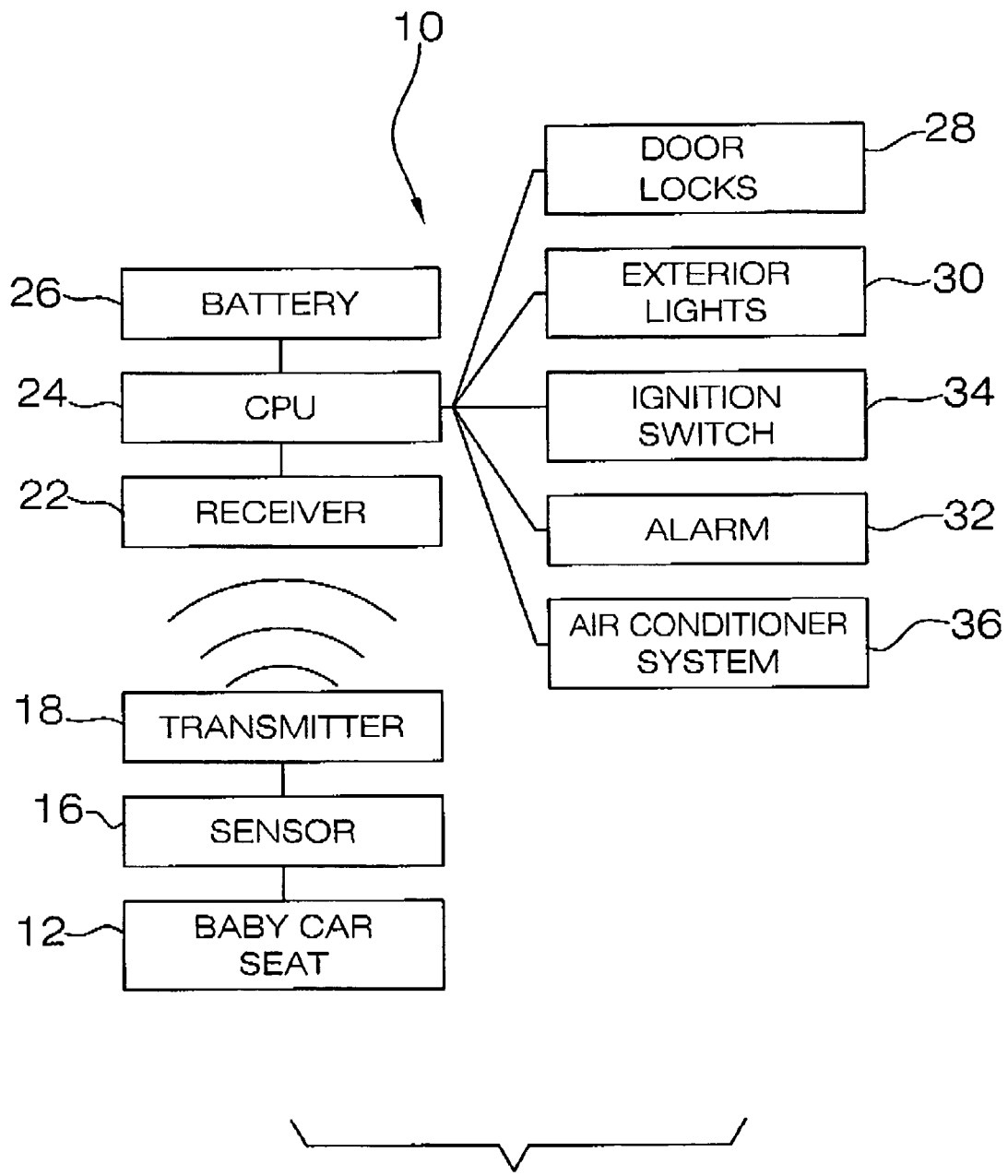
FIG. 3 is a block diagram of the safety system according to the present disclosure.

Referring now to the drawings of FIGS. 1-3, a vehicle child seat safety system 10 is partially placed in a child seat 12, which can be independent of a vehicle, and partially constitutes a portion of the equipment of the vehicle 14. The system comprises a sensor 16 in the seat 12, a transmitter 18 in the seat 12 connected to the sensor 16 by wiring 20, a receiver 22 in the vehicle 14, a CPU 24 fed from a battery 26 and connected to the receiver 22, as well as door locks 28, exterior alarm lights 30, a source 32 of an alarm sound signal, ignition switch 34, and air-conditioner 36. Wiring 38 connects elements of the system inside the vehicle 14.

There are two sensors which activate the system. The main sensor 16 is located in the child seat, while the secondary sensor 39 is located in the drivers seat. The system is activated when the child is seated in the child seat 12, which is detected by the child seat sensor 16. The active sensor 16 activates the alarm and light signals, which are deactivated when the driver is seated. When the driver exits the vehicle by leaving his seat, the alarm and light signals are reactivated until the child is removed from the child seat. After a predetrmined time (for example, 2 minutes) expired, and the child (not shown) is still in the seat or not taken out of the vehicle with the seat, the sensor activates the transmitter 18 to send a warning signal to the receiver 22. The receiver 22 advises the CPU of receiving the warning signal, which triggers the sequence of events. The exterior warn signals and audio alarm sugnal are turned on.

This would be enough to draw attention of the vehicle driver and passersby to the fact that a child is left unattended in a hot vehicle. It would be not enough, however, to rescue the child.

If the child is not removed within 2 minutes from the vehicle after the driver has left, the system further starts the ignition 34 and air-conditioner 36 and operates the door locks 28 to unlock the doors. The passersby thus gain access to the vehicle to rescue the child.

The system according to the present disclosure can be offered in versions for infants, toddlers, and young children. Other possible variations could include offering an electric-powered version (not shown) that would be capable of reclining for comfort. Also, the system can be offered as a modified new car seat that would interface with the vehicle's security system. Alternatively, it could be built into new vehicles and offered by OEM as an optional safety/security feature.

It is believed that the system according to the preent disclosure would fulfill the need for a car seat safety system that would safeguard a baby or young child from being left in a vehicle, helping to prevent tragic heat-related injuries or deaths of children.

The appealing features of the system according to the present disclosure would be its ease of use, the peace of mind enjoyed by busy parents, and the increased safety that could be achieved for babies and young children. It would alert the driver and passersby that the baby was in the car seat in the hot vehicle, would keep the vehicle cool by starting it and turning on the air conditioning, and would unlock its doors for rescuers to remove the child. The system would ensure that a tendency for busy parents to be forgetful would not result in the death or serious injury of their child. With this safety system, parents could be assured that their babies and young children would remain safe and would not be inadvertently abandoned for long periods of time in hazardously hot vehicles.

Those skilled in the art can now appreciate from the foregoing description that the broad teachings of the present disclosure can be implemented in a variety of forms. Therefore, while the vehicle child seat safety system of the present disclosure has been described in connection with a particular example thereof, the true scope of the disclosure should not be so limited since other modifications will become apparent to the skilled practitioner upon a study of the drawings, specification and claims that follow.

What is claimed is:

1. A method of informing of a child left unattended in a locked vehicle, the method comprising the steps of:
   providing a sensor in a child seat,
   starting the sensor when ignition of the vehicle was turned off,
   generating a warning signal and transmitting same from a transmitter in the child seat after a predetermined time elapsed since the starting of the sensor,
   receiving the warning signal in the vehicle and sending same to a CPU of the vehicle,
   starting an alarm sound signal, and
   turning exterior alarm lights on,
   whereby a driver and passersby are alerted, their attention being drawn to the vehicle with the child left unattended, and if the sensor is not disabled, further
   unlocking door locks, and
   starting ignition and air conditioner to bring the temperature in the vehicle back to normal and make it possible for the driver and passersby to access the vehicle to prevent the child from being exposed to high temperature inside the locked vehicle and thus to rescue the child.

* * * * *